Feb. 21, 1967  F. HOCK  3,305,691
APPARATUS FOR PHOTOELECTRICALLY MEASURING THE POSITION
OF A SCALE MARKER
Original Filed Aug. 27, 1962
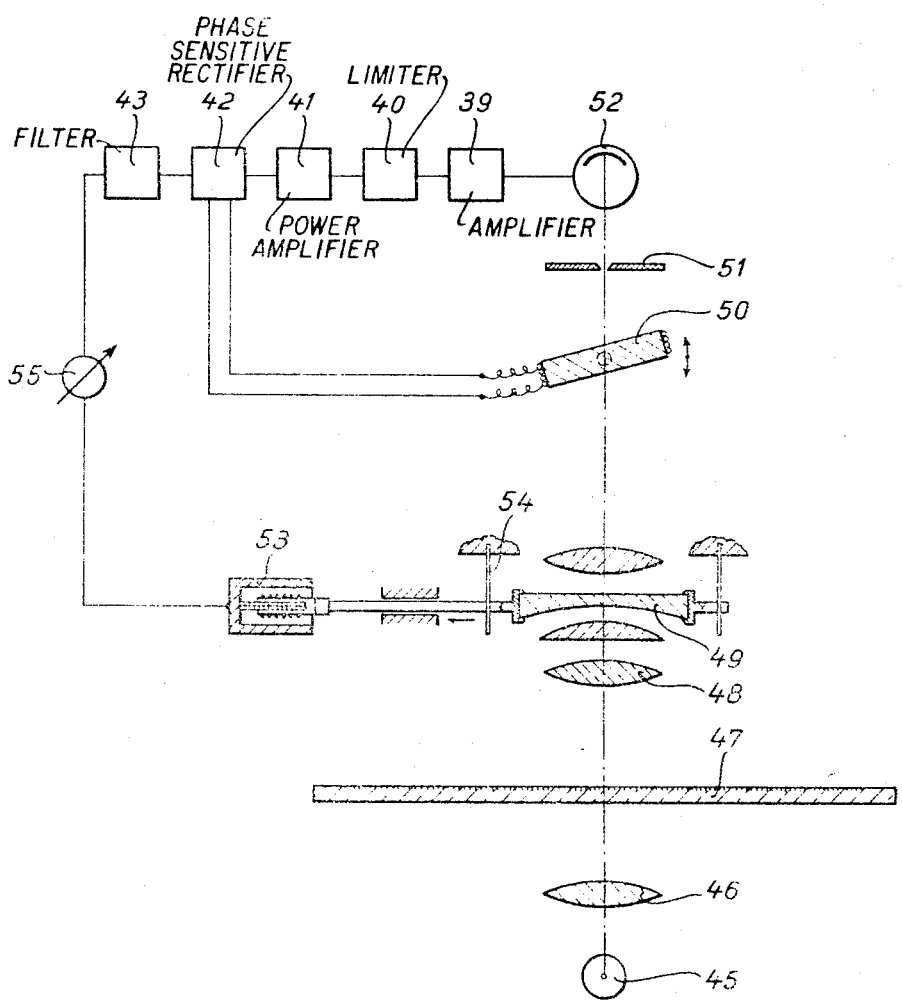
INVENTOR
FROMUND HOCK

United States Patent Office 3,305,691
Patented Feb. 21, 1967

3,305,691
APPARATUS FOR PHOTOELECTRICALLY MEASURING THE POSITION OF A SCALE MARKER
Fromund Hock, Wetzlar (Lahn), Germany, assignor to Ernst Leitz G.m.b.H., Wetzlar (Lahn), Germany
Original application Aug. 27, 1962, Ser. No. 219,417, now Patent No. 3,254,227, dated May 31, 1966. Divided and this application Aug. 25, 1965, Ser. No. 482,439
6 Claims. (Cl. 250—235)

This application is a division of application, Ser. No. 219,417, filed August 27, 1962, now Patent No. 3,254,227.

The present invention relates to an apparatus for photoelectrically measuring the position of a scale stroke or marker.

It is known in the art to photoelectrically scan a scale wherein the scanning system includes a periodically moving element such as a slit diaphragm, a plane parallel plate oscillating about an axis which is parallel to the surface planes of the plate, a rotary cube, or a rotating diaphragm with a spiral gap. The output signal of the photoelectric receiver is phase sensitively rectified, and the corresponding output is indicative of the exact position of the scale relative to the scanning system. Other known apparatus determine the relationship between the time the periodic scanning system responds to a scale stroke and the periodic actuation of the system.

The known systems have the disadvantage that they do not accurately register the displacement of the scale stroke from a zero position since the amplitude of the photoelectric output signal includes the existing illumination conditions, the characteristics of the amplifier employed and the amplitude of the oscillating scanner itself. In apparatus operating by comparing the time of pulse occurrences, the accuracy of measurement further depends on the uniformity of the amplitude of the oscillating scanner; this requires considerable expenditure in electrical or mechanical means ensuring constant motions.

It is therefore a primary object of the present invention to devise an apparatus which does not have the aforementioned disadvantages, and, in particular, an apparatus in which ambient light and the mechanical properties of the elements employed do not modify the accuracy of determination of the position of a scale stroke or marker.

It is a feature of the present invention to employ a deflecting or dimming optical element oscillating in the light path extending between photoelectric receiver and scale so as to modulate the light received; relative to the photoelectric receiver, the scale stroke can have a neutral position or a deflected position; if a scale stroke is in one of the latter positions, the light received will be modified. The light will also be dynamically modulated by the said oscillating optical element before entering the receiver; according to the primary feature of the invention, the output of the photoelectric receiver is fed to a feedback control element influencing the geometrical position of the said light path from the stroke so as to have the oscillation carried out about a zero position wherein the scale stroke as observed by the photoelectric receiver, i.e., its image, registers therewith. The static operation conditions of the feedback loop necessary to maintain stable conditions at a given scale position is used to indicate or record the exact scale stroke position relative to neutral position as defined by inactivated feedback loop.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

The figure is a schematic diagram of an embodiment of the invention.

In FIGURE 2 of Patent No. 3,254,227, it is shown how the mechanical oscillator itself is provided with a zero shift with respect to a geometrical path, which can also be defined by a scale stroke in unit-indicating position registering with the axis of lens 36, neutral position of the oscillator-photoelectric receiver (optical axis of prereceiver objective lens). This is carried out in providing additional bias and galvanically coupling impelling and position sensing coil (23 and 24 respectively) with a D.C. biasing source (filter output 43).

In the figure of the present application, it is shown how the zero shift is galvanically separated from the electromechanical oscillator while the oscillator itself (geometrically) retains its position, but the optical path of the light beam for diaphragm and scale is shifted. It thus can be said that within the concept of the invention, it is only important to shift the diaphragm relative to the optical path or vice versa, whereby the zero position is defined by the respectively existing optical path. Whether the latter is shifted towards a (constant) zero and neutral position of the oscillator or whether the optical path is maintained while the zero position of the oscillator is shifted out of the neutral position (FIGURE 2 of Patent No. 3,254,227), is immaterial.

Turning now to the detailed description of the figure, amplifier 39, limiter 40, power amplifier 41, phase sensitive rectifier 42, and filter 43 correspond to elements 39 to 43 in FIGURE 2 of Patent No. 3,254,227. The input terminal of amplifier 39 is connected to a simple photoelectric receiver 52 placed adjacent a stationary diaphragm 51 which in turn receives light from a lamp 45 after having passed through the following elements: an objective lens 46 illuminating a scale 47, an objective 48, and a lens system 49 having an overall power of refraction of zero but shifting an optical path upon being shifted perpendicular to the optical axis of objective 48 (see double arrow).

Lens system 49 is suspended by leaf springs 54 so as to normally retain the optical axis as defined by the optical axis of objective 48. This corresponds to the neutral position as defined above. Then there is a pivotable plane parallel plate 50 having its pivot axis extending perpendicular to the plane of the drawing and crossing the optical axis of objective 48. Plate 50 merely oscillates or modulates the light while lens system 49 effects shifting thereof and the formation of the beam is effected by diaphragm 51. These three elements therefore accomplish the same results as diaphragm 26 of FIGURE 2 of Patent No. 3,254,227.

The output current of filter 43 is fed to a solenoid 53 having an armature plunger secured to axis-shifting lens system 49.

The pivotable plate 50 oscillates, it is shown in a deflected position; in zero position the planes are perpendicular to the optical axis of objective 48.

The elements causing plate 50 to oscillate are omitted, but it can be assumed that they are similar to those disclosed in FIGURE 1 of Patent No. 3,254,227 for oscillating diaphragm 26. One simply can connect rod 25 of FIGURE 1 of Patent No. 3,254,227 to a stationary pivot while connection between rod 25 and tube 22 is likewise a pivotable one. The plate 50 then is mounted on the rod 25 at the first mentioned pivot and will oscillate as the rod is actuated.

Elements 30 to 34 of FIGURE 2 of Patent No. 3,254,227 are likewise employed in the embodiment of the figure of this application, but there is no corresponding connection between filter 43 and coils 23 and 24. In lieu thereof, the output of filter 43 actuates solenoid 53 shifting lens system 49 and therefore the optical axis relative to plate 50. During operation, the solenoid will shift lens 49 so that the image of a scale stroke always runs approximately through the pivot axis of plate 50 and the optical axis of diaphragm 51. The current to maintain such position of lens 49 is measured in instrument 55 and indicates the relative shift of a scale stroke from neutral position.

The invention is not limited to the embodiments described above but all changes and modifications thereof not constituting departures from the spirit and scope of the invention are intended to be covered by the following claims.

What is claimed is:

1. Apparatus for photoelectrically measuring the position of a scale marker, the combination comprising: photoelectric receiver means observing said scale marker; an optical modulating element in the light path between said receiver means and said scale marker; electromagnetic means including a pickup coil and an impelling coil and a regenerative feedback loop interconnecting said coils for causing said optical element to oscillate thereby modulating the light as received in said receiver means; optical means defining a light ray path through said optical element onto said receiver means; frequency selective amplifier means connected to said receiver means; phase sensitive rectifier means connected to said amplifier and deriving a reference signal from said feedback loop to provide a direct current output signal proportional to the lateral displacement of said scale member; optical displacement means connected to said direct current output signal for causing a lateral displacement of said ray path in the direction of extension of said scale; and electrical indicating means connected to said rectifier means for measuring the direct current output signal thereof as an indication of said lateral displacement.

2. Apparatus for photoelectrically measuring the position of a scale marker, the combination comprising: photoelectric receiver means observing said scale marker; an optical modulating element in the light path between said receiver means and said scale marker; electromagnetic means including a pickup and an impelling coil and a regenerative feedback loop interconnecting said coils for causing said optical modulating element to oscillate thereby modulating the light as received in said receiver means; optical means defining a light ray path through said optical element onto said receiver means; frequency selective amplifier means connected to said receiver means; phase sensitive rectifier means connected to said amplifier and deriving a reference signal from said feedback loop to provide a direct current output signal proportional to the lateral displacement of said scale marker; electromechanical means connected to said rectifier direct current output signal for laterally displacing said ray path in the direction of extension of said scale; and electrical indicating means connected to said rectifier means for measuring the direct current output signal thereof as an indication of said lateral displacement.

3. An apparatus for photoelectrically measuring the position of a movable scale graduated in the direction of movement thereof comprising: a light source supplying light to said scale to illuminate said scale, a photoelectric receiver observing said scale so as to receive at least some of said light therefrom, first means between the light source and said receiver through which the light from said source passes operable to define a beam of light falling on said receiver so that movement of the scale will cause the graduation thereof to modify the light falling on said receiver, second means in the path of said light operable for periodically modulating the light falling on said receiver, phase sensitive circuit means having an input side connected to receive the output from said receiver and having an output side and operable to deliver a direct current signal proportional to the relative lateral displacement of said scale and said first means to said output side, lens means also in the path of the light and connected to the output side of said circuit means and operable in response to said signal thereof to effect displacement of the beam of light falling on the receiver in the direction of extension of said scale and in an amount proportional to the strength of said signal, and third means also connected to the output side of each circuit means and operable to measure the strength of said direct current signal therefrom to thereby measure the amount of said displacement of said beam.

4. An apparatus according to claim 3, wherein the lens means includes a solenoid means connected to the output side of said circuit means and mechanically coupled to a shift-lens, said solenoid means being operable for shifting said shift-lens an amount proportional to said direct current signal.

5. An apparatus according to claim 3, wherein the second means is a pivotal plate means.

6. An apparatus according to claim 3, wherein the first means is a diaphragm having a slit therein.

References Cited by the Examiner

UNITED STATES PATENTS

| | | | |
|---|---|---|---|
| 2,924,768 | 2/1960 | Farrand et al. | 88—14 |
| 3,037,156 | 5/1962 | Koulikovitch | 250—235 X |
| 3,055,263 | 9/1962 | Kuehne | 250—203 X |
| 3,116,886 | 1/1964 | Kuehne | 250—231 |

RALPH G. NILSON, *Primary Examiner.*

J. D. WALL, *Assistant Examiner.*